United States Patent [19]

Gilbert

[11] Patent Number: 4,498,484
[45] Date of Patent: Feb. 12, 1985

[54] TOBACCO STRIPPER

[76] Inventor: Jerald G. Gilbert, Rte. 9, Box 352B, London, Ky. 40741

[21] Appl. No.: 400,235

[22] Filed: Jul. 21, 1982

[51] Int. Cl.³ .............................................. A01D 1/00
[52] U.S. Cl. .................................................. 130/30 R
[58] Field of Search ..................................... 130/30 R

[56] References Cited

U.S. PATENT DOCUMENTS 4,350,172 9/1982 Guthrie .............................. 130/30 R
4,373,323 2/1983 Jones .................................. 130/30 R
4,416,294 11/1983 Turpin ............................... 130/30 R

FOREIGN PATENT DOCUMENTS

519161 7/1976 U.S.S.R. ............................ 130/30 R

Primary Examiner—V. Millin
Attorney, Agent, or Firm—Birch, Stewart, Kolasch & Birch

[57] ABSTRACT

A tabacco stripper having a stripper opening which is initially expandable to provide ample room for receiving the end of a tobacco stalk and then collapses on the stalk under spring tension to strip the leaves of the tobacco from the stalk without damage. The tobacco stripper includes a four-blade stripping assembly which expands in response to the actuation of a foot pedal and then contracts against the round tobacco stalk under the action of a spring tensioning means to strip the stalks as they are moved through the opening. Each of the four stripper plates have circular openings which are superimposed, and collectively define a circular opening during the full range of their respective movements, which conforms to the shape of the tobacco stalk being processed.

12 Claims, 16 Drawing Figures

TOBACCO STRIPPER

BACKGROUND OF THE INVENTION

1. Field of the Invention

The present invention relates to a blade assembly for stripping leaves from a substantially circular plant stalk. More specifically, the present invention relates to an apparatus for stripping leaves from the stalks of tobacco plants.

2. Description of Prior Art

Heretofore, various types of apparatus have been developed for stripping the leaves from the stalks of tobacco plants. Although these devices have been satisfactory in some respects, they have not been totally satisfactory for commercialization and use in the mass market. For example, prior art apparatus have not been provided with stripping orifices which are readily expandable for initially receiving a tobacco stalk and then readily closable to a stripping position for operation and continuation of the stripping process. In addition, stripper openings of prior art devices have not been substantially circular throughout all positions of the stripping blades in order to accommodate the substantially circular stalks of tobacco. Furthermore, the blade assemblies of known prior art devices which define the stripper openings will generally not accommodate crooked stalks; are not adaptable to stripping various kinds and varieties of tobacco; and are not capable of salvaging the feathered edge of the tobacco leaves adjacent the stalk. Accordingly, a need in the art exists for a tobacco stripping apparatus and blade assembly therefor which overcomes the above-described disadvantages.

SUMMARY OF THE INVENTION

Accordingly, it is a primary object of the present invention to provide a tobacco leaf stripper adapted for and capable of removing the maximum amount of tobacco leaf from the tobacco stalk at a very rapid speed without any damage to the leaf.

It is another object of the present invention to provide a tobacco leaf stripper which is simple in construction, durable, dependable, efficient and economical for use by both the small and large farmer.

It is still a further object of the present invention to provide a tobacco leaf stripper with an expandable orifice which is large enough to confortably accommodate the insertion of a tobacco stalk and which contracts mechanically against the stalk for continuation of the stripping process.

It is yet another object of the present invention to provide a tobacco stripper which is adjustable to facilitate stripping of all kinds, types, sizes and moisture contents of tobacco.

It is still another object of the present invention to provide a tobacco stripper having the ability to salvage all of the feather edge of the tobacco leaf attachment to the stalk.

It is still a further object of the present invention to provide a tobacco stripper having the ability to strip tobacco leaves from stalks that have morning glories (weeds) wound around the stalk.

It is another object of the present invention to provide a tobacco stripper having the ability to strip a stalk of tobacco that is crooked without damage to the leaves.

The objects of the present invention are fulfilled by providing a novel blade assembly for stripping leaves from a substantially circular tobacco stalk comprising:

blade guide means including four-channel sections defining a cruciform shape and extending outwardly from a central opening adapted for passing the tobacco stalk therethrough as the leaves thereon are stripped;

a stripper blade disposed in each of the channel sections for reciprocating movement with respect to the central opening, each of the blades having a substantially circular aperture therein overlying the central opening and superimposed with respect to the respective circular apertures of the other blades, and an outboard end having an actuating cam surface thereon, the circular apertures of the blades collectively defining a substantially circular stripper opening in all positions of the blades, the size of which is adjustable in response to a mechanical force supplied to the actuating cam surfaces;

a blade pusher means for simultaneously engaging the actuating cam surfaces for applying the mechanical force thereto to move the blades outwardly in the channel sections, and thereby enlarge the stripper opening defined by the blade apertures;

a spring tension means for yieldably biasing the blades toward the central opening to positions defining a minimum size stripper opening; and a foot pedal for initiating movement of the blade pusher means to enlarge the stripper opening in response thereto.

The stripper of the present invention performs a stripping process in a very rapid and simple manner. One foot of the operator is placed on the foot pedal and a force of approximately two foot pounds is applied thereto. This causes the blade pusher to rotate and slide the stripper blades outwardly to expand the stripper opening to a diameter of approximately two inches. This provides ample room for the tip or top end of the tobacco stalk to be inserted into the stripper head assembly without damage to the leaves. Immediately after the introduction of the stalk into the stripper opening, the foot pedal is released and the stripper blades close down on the stalk under spring tension. The stalk is then gripped by a pair of rotatable drive rollers disposed behind the stripper head assembly and pulled through the stripper opening. The rollers then pull the entire stalk through the stripper opening and the independent spring tension provided by the stripper blades. As the stalk proceeds through the stripper opening, the tobacco leaves are shaved and removed from the stalk, yielding a maximum weight by removing all the stems and feather leaf attachment from the stalk. After the tobacco stalk is forced completely through the stripper blade by the drive rollers, the stripper blades close, thereby holding all the tobacco leaves straight and in proper order. The tobacco leaves are then removed from the stripper blades and placed in a baler box or the like for shipping.

Tobacco can be stripped into two different grades by placing the stalk between the thumb and the index finger at the desired breaking point of the grades. The other hand, holding the stalk at the large end, inserts the stalk into the stripping head assembly. After the introduction of the stalk into the stripping head assembly, the stalk is followed by the hand placed at the desired breaking point, and as the stalk moves through the stripper plates, one grade is rendered and held by the stripper plates and the other grade will be held between the thumb and the index finger of that hand.

BRIEF DESCRIPTION OF THE DRAWINGS

The objects of the present invention and the attendant advantages thereof will become more readily apparent by reference to the drawings, wherein like reference numerals refer to like parts and wherein.

DETAILED DESCRIPTION OF PREFERRED EMBODIMENT

Figures 1, 2:
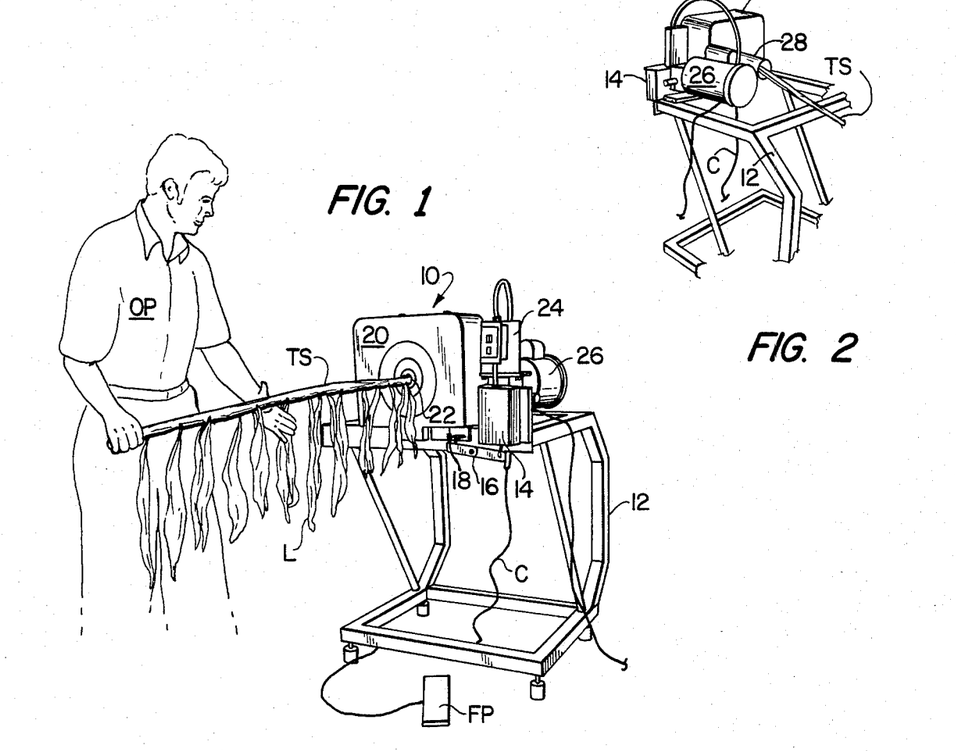
FIG. 1 is a front perspective view of the tobacco stripper apparatus of the present invention illustrating the insertion of a tobacco stalk thereinto by an operator.
FIG. 2 is a rear perspective view of the tobacco stripper of the present invention illustrated in FIG. 1.

Referring to FIG. 1, there is illustrated a tobacco stripper apparatus of the present invention generally indicated 10. It is provided with a housing 20 having a stripper opening 22 therein which is disposed on a support frame 12. It should be understood that the stripper head assembly including the stripper blades, guide means therefor, and blade pusher element, are disposed directly behind stripper opening 22 in housing 20, and when reference is made herein to a front view of those components, it refers to surfaces thereof which are disposed directly behind opening 22 and facing the same.

Referring further to FIG. 1, there is illustrated an operator OP holding a tobacco stalk TS having leaves L thereon which is to be inserted into opening 22. A motor 26 is provided for turning drive rollers which grip the tobacco stalk TS as it passes through the stripper head assembly in a manner to be described more fully hereinafter. FIG. 1 further illustrates a foot pedal FP electrically connected through a cable C to a solenoid within box 14 which is, in turn, coupled through a lever 16 to a wire 18 connected to the blade pusher assembly, to be described further hereinafter. Also illustrated in FIG. 1 is an electrical control panel 24 including an ON-OFF switch and other similar devices.

Referring to FIG. 2, there is illustrated in rear perspective the tobacco stripper apparatus of FIG. 1. This Figure illustrates, in addition to the elements described in connection with FIG. 1, a stalk exit chute 28 from which the tobacco stalk TS is ejected after stripping by the stripper head assembly within housing 20.

Figure 3A:
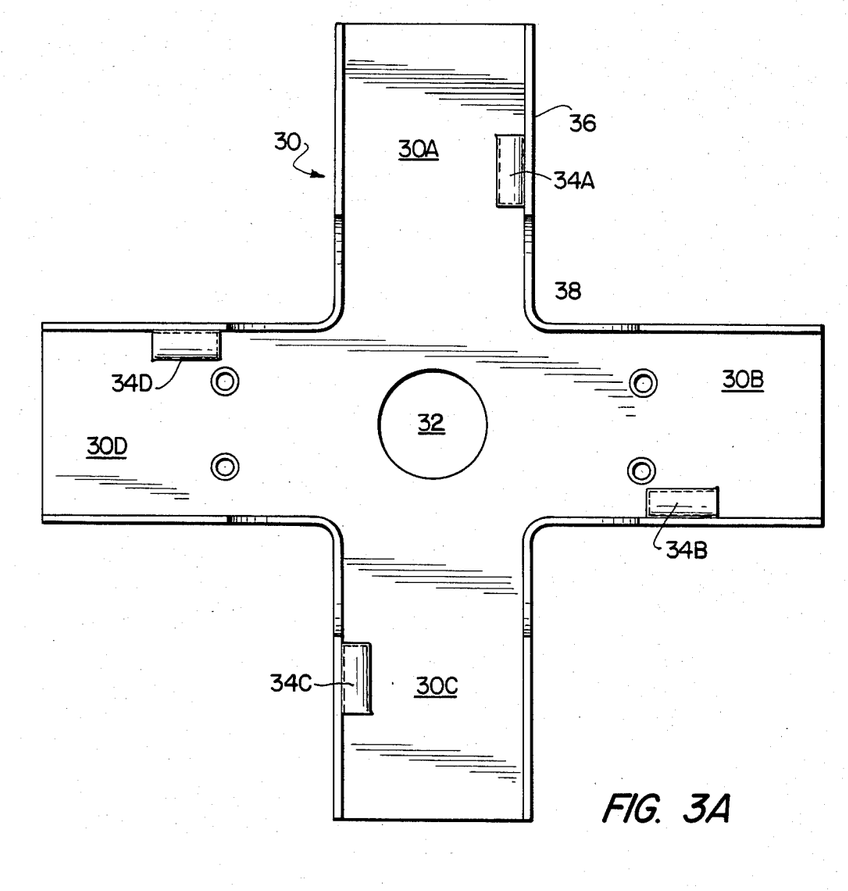
FIGS. 3A and 3B are front plan and side elevation views respectively of the blade guide channel of the stripping head assembly of the present invention.
Figure 3B:
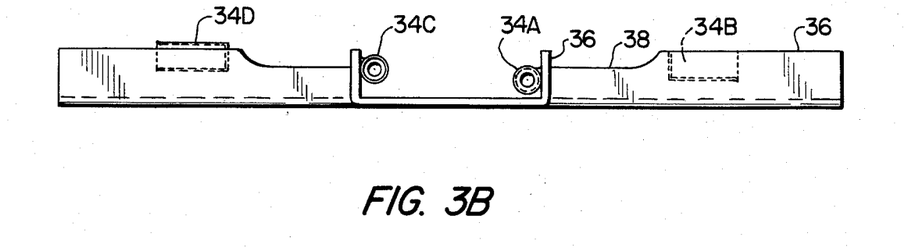

Referring to FIGS. 3A and 3B, there is illustrated the blade guide means of the present invention generally indicated 30, which has the general shape of a cruciform defined by the four respective guide channel sections 30A, 30B, 30C, 30D. The channel sections are substantially U-shaped in end view, as illustrated in FIG. 3B, forming guide slots for the stripper blade, to be described hereinafter in connection with FIGS. 4A, 4B. The guide means 30 is also provided with a central aperture 32 which is directly disposed in alignment behind opening 22 in the stripper apparatus illustrated in FIG. 1 within the housing 20. The cruciform-shaped guide means 30 is further provided with sockets 34A, 34B, 34C, 34D for receiving coil spring tension means, to be described further hereinafter with respect to FIG. 9. The upstanding sidewalls of the U-shaped channel sections are lower in a central portion 38 for receiving the rotatable blade pusher assembly of FIGS. 6A, 6B, 6C, to be described hereinafter.

Figure 4A:
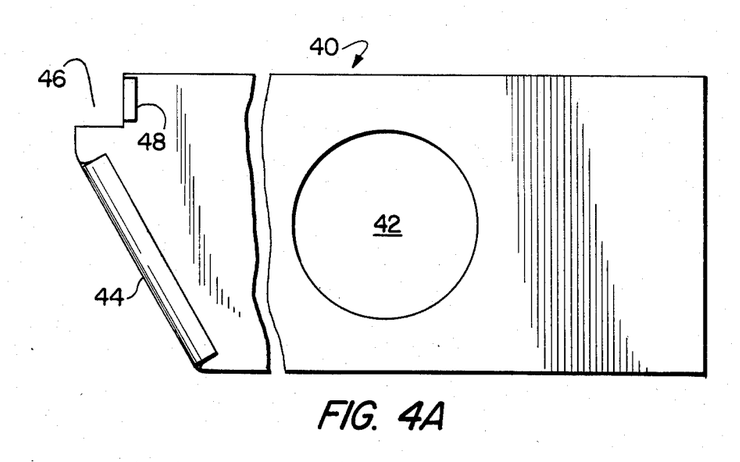
FIGS. 4A and 4B are front and side elevation views, respectively, of a typical stripper blade for use in the stripper head assembly of the present invention.
Figure 4B:
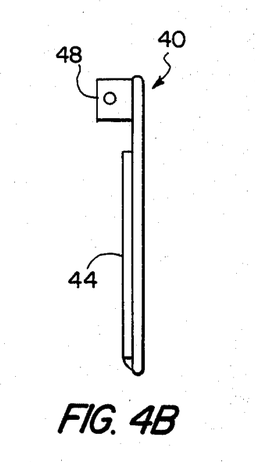
Figure 9:
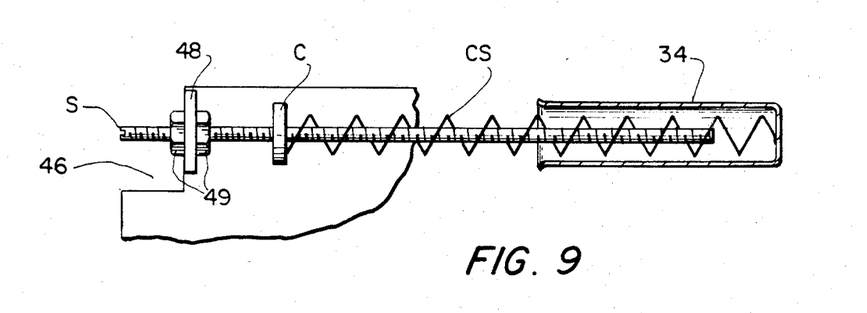
FIG. 9 illustrates the spring tensioning for the respective blades of the present invention.

Referring to FIGS. 4A and 4B, there is illustrated a typical stripper blade element of the present invention generally indicated 40, including a circular aperture 42, an actuator cam surface 44, a cut-away portion 46 for receiving an adjustment screw to be described in connecion with FIG. 9, and an upstanding tap 48 for supporting one end of the adjustment screw of the tensioning mechanism illustrated in FIG. 9. the blades 40 are disposed in the respective guide channel sections 30A, 30B, 30C, 30D, with the actuator cam surfaces 34 disposed outboard of the central aperture 32 in the cruciform-shaped guide means 30. The apertures 42 of the stripper blades are superimposed with respect to each other and the circular opening 32 within the guide means 30.

Figure 5A:
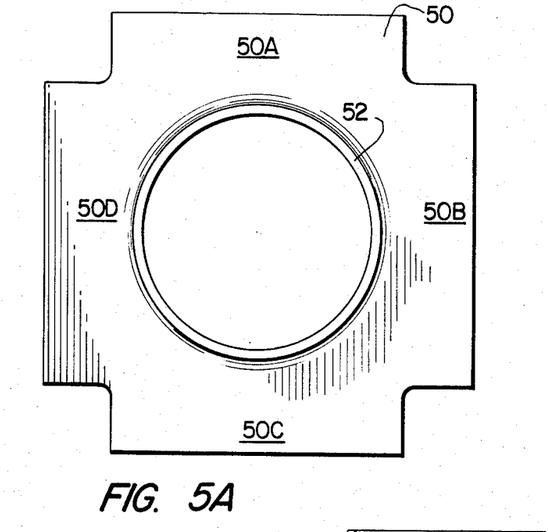
FIGS. 5A and 5B are front plan and side elevation views, respectively, of a retainer plate for holding the stripper blades of FIGS. 4A, 4B within the blade guide means of FIGS. 3A, 3B.
Figure 5B:
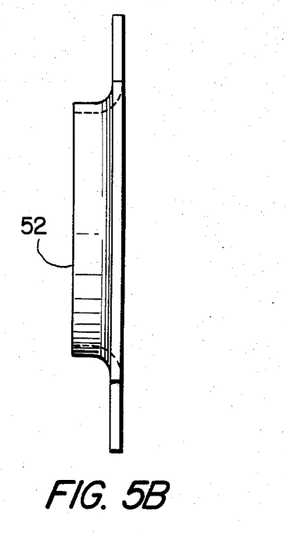

FIGS. 5A and 5B illustrate a retainer plate 50, which fits over the stripper blades 40 within the guide channels of guide means 30 and retains the blades therein. This retainer plate 50 is also provided with an upstanding circular flange 52, which acts as a bearing race for the rotatable pusher element 60 illustrated in FIGS. 6A, 6B, 6C.

Figure 7A:
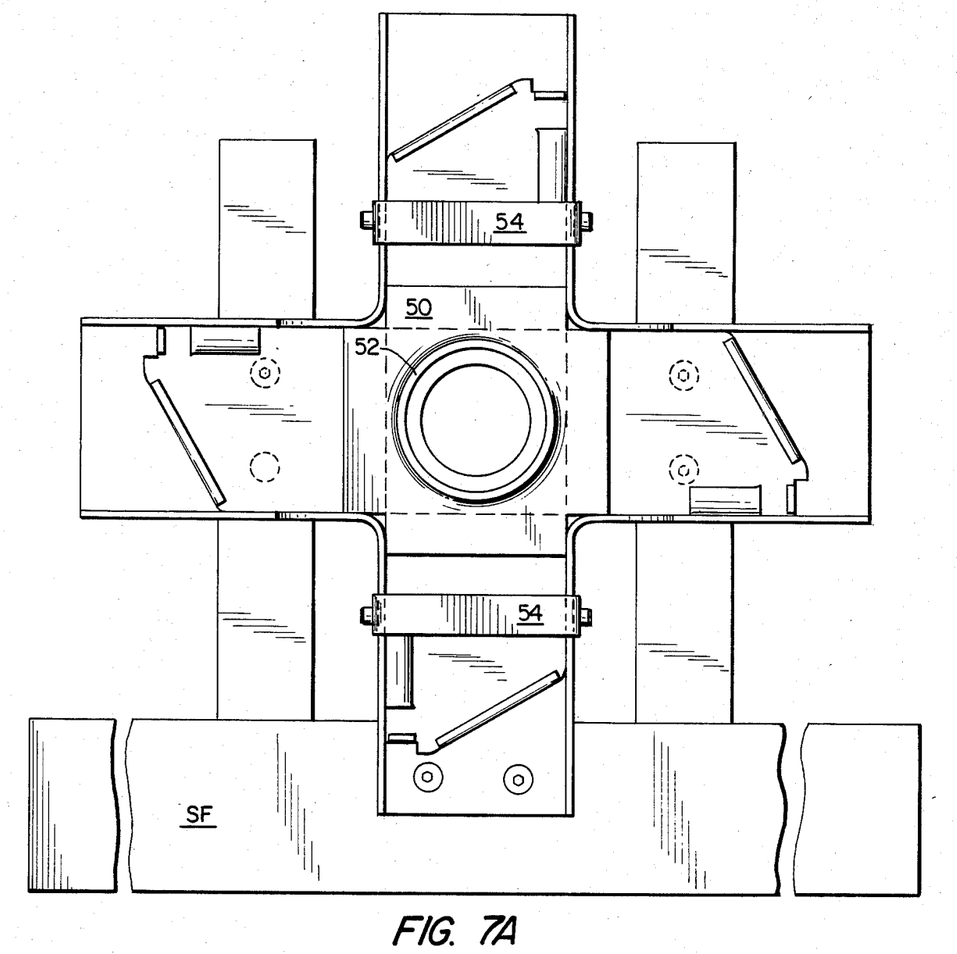
FIG. 7A is a front plan view showing the assembly of the blade guide means of FIGS. 3A, 3B, the retainer assembly of FIGS. 5A, 5B and the interposed stripper blades of FIGS. 4A, 4B.
Figure 7B:
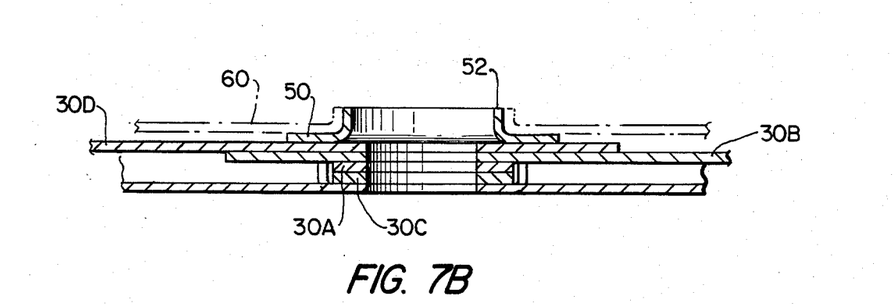
FIG. 7B is a side view in section of the assembly of FIG. 7A.

The retainer plate 50 and the manner in which it secures the blades 40 within the cruciform-shaped guide means 30 is further illustrated in FIGS. 7A, 7B. FIG. 7A illustrates how the cruciform-shaped guide channel means 30 is secured to a support frame SF within the stripper apparatus housing 20 directly behind the opening 22. Additional pusher retaining straps 54 are provided to hold pusher element 60 in the overall assembly.

Figure 6A:
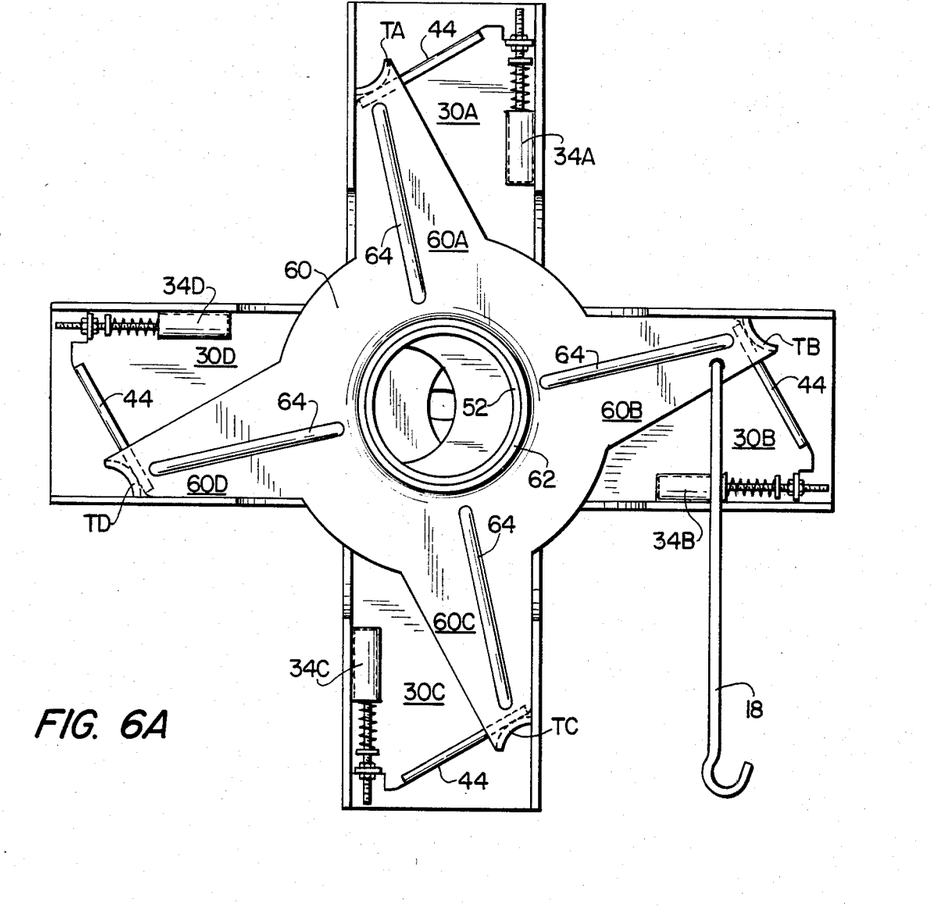
FIG. 6A is a front plan view of a rotatable blade pusher element of the present invention illustrated in a position in which the stripper opening defined by the blades of FIGS. 4A, 4B are in a substantially closed position.
Figure 6B:
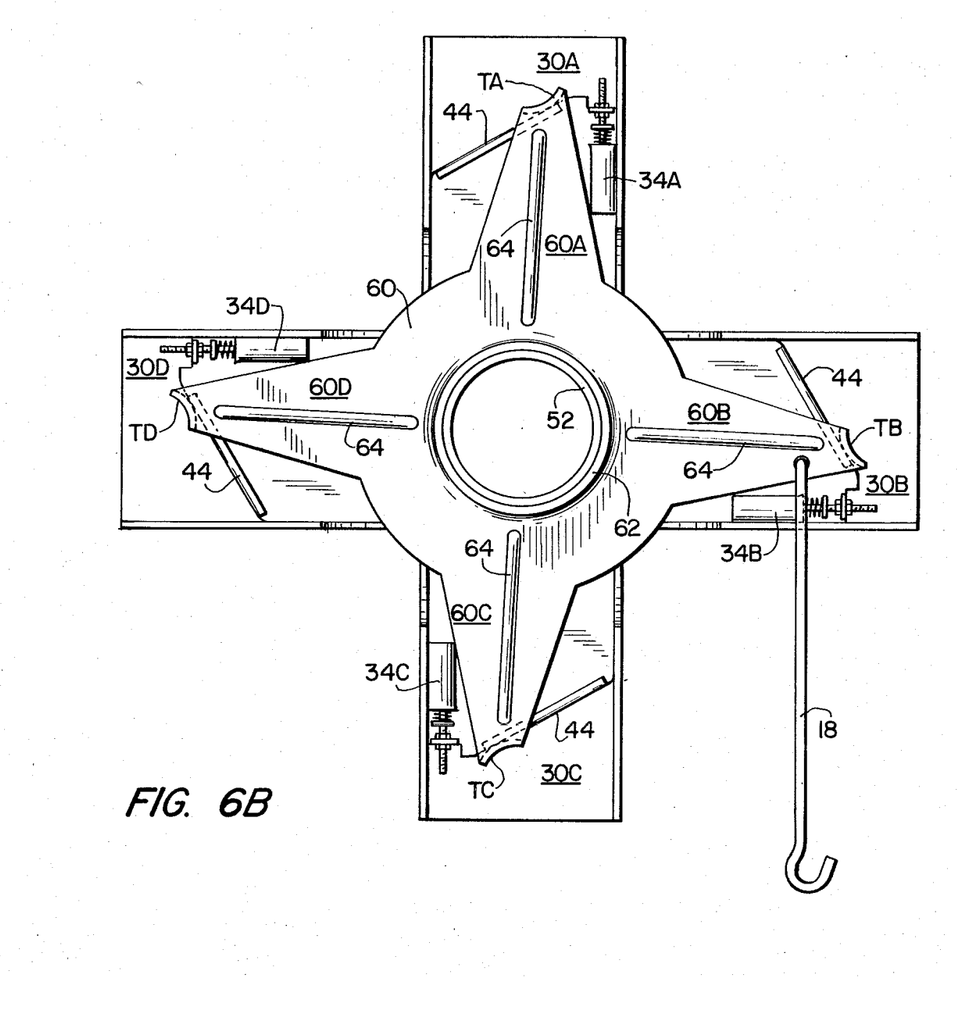
FIG. 6B is a front plan view of the blade pusher element of the present invention in a position in which the stripper opening defined by the blades of FIGS. 4A, 4B define a substantially open stripper opening.
Figure 6C:
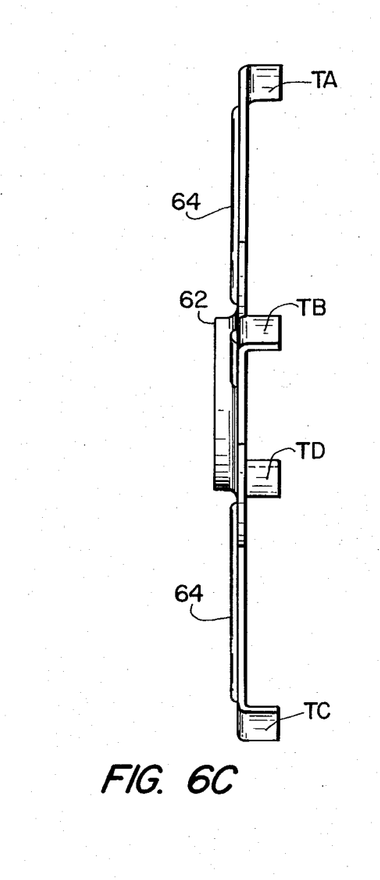
FIG. 6C is a side elevational view of the blade pusher element per se of FIG. 6A and 6B.

Referring to FIGS. 6A, 6B, 6C, the structure an operation of the rotatable blade pusher assembly of the present invention may be readily understood. The blade pusher assembly 60 is provided with a central hub portion disposed about a bearing ring 62 which rides on the bearing race 52 provided by the retainer plate 50. The pusher element 60 has four radial arms 60A, 60B, 60C, 60D and pusher tabs TA, TB, TC, TD, depending therefrom for operative association with the respective actuator cam surfaces of the respective stripper blades described hereinbefore. Rotation of the stripper element 60 may be imparted by a wire link 18 coupled to radial arm 60B. It can be readily seen in the illustration of FIG. 6A that when wire link 18 is pulled downwardly, tabs TA, TB, TC, TD engage each of the respective actuator cam surfaces to move the respective blades inwardly and substantially close the stripper openings defined by the overlapping circular apertures of the respective blades. It can also be readily observed from the illustration of FIG. 6A that in this substantially closed position, the stripper opening defined by these respective circular apertures is also substantially circular corresponding to the typical cross-section of a tobacco stalk.

FIG. 6B illustrates the blade pusher 60 and the associated blades 40 in an expanded or open position which would occur in response to the actuation of the foot pedal FP of FIG. 1 under control of the solenoid within the housing 14. That is, upon actuation of the foot pedal FT, the wire link 18 would be pulled downwardly by the lever 16 coupled to the solenoid within housing 14, causing the tabs TA, TB, TC, TD to apply a force against the cam surfaces 44, pushing the respective blades inwardly and thereby opening the stripper opening defined by their respective circular apertures.

Figure 8A:
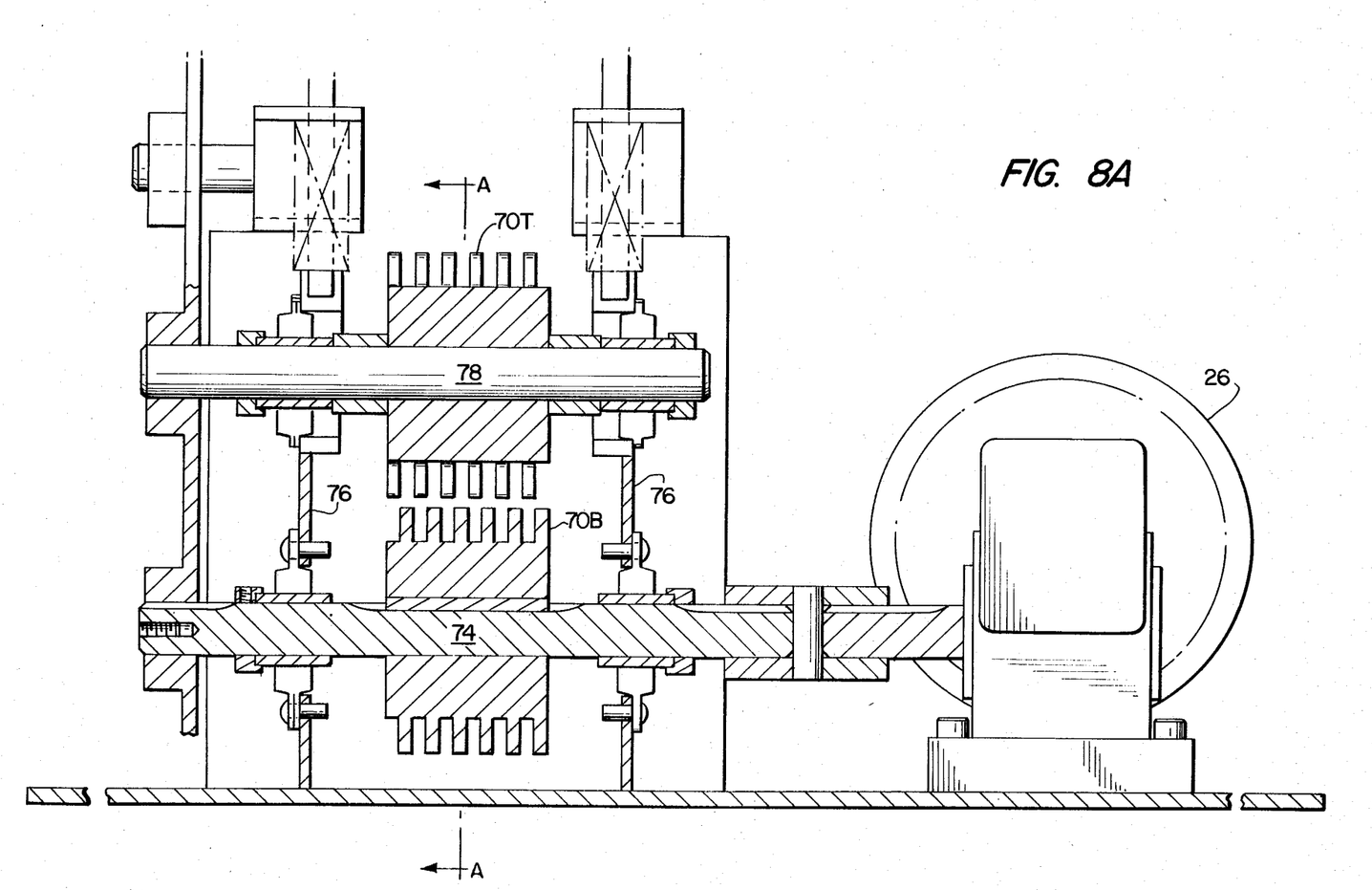
FIG. 8A is a rear elevational view illustrating the drive rollers of the present invention for pulling a tobacco stalk through the stripper head assembly.
Figure 8B:
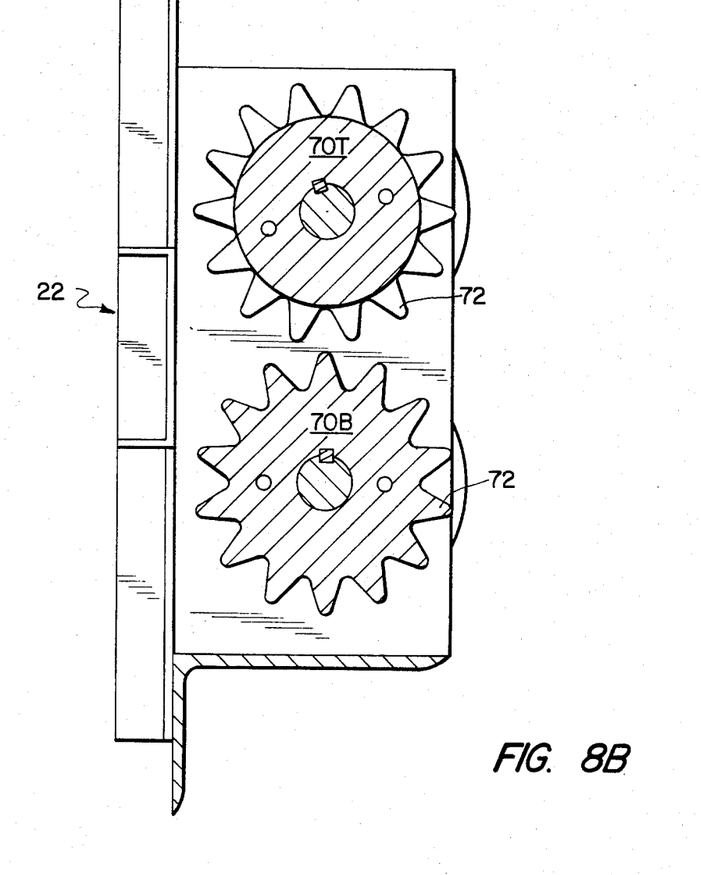
FIG. 8B is a section taken along line A—A of FIG. 8A, further illustrating the nature of the drive rollers.

Referring to FIGS. 8A and 8B, there is illustrated a pair of drive rollers 70T and 70B for receiving the leading end of the tobacco stalk introduced through aperture 22 into the stripper head assembly. It can be seen that these drive rollers 70T, 70B with teeth 72 thereon are directly aligned behind the central opening of the stripper head assembly and thereby grip the leading end of the stalk and provide the necessary driving force to pull the stalk through the stripper blades. As illustrated in FIG. 2, the stalk will then be ejected out of the discharge chute 28 at the completion of the stripping process. The drive rollers 70T, 70B are driven by an electric motor 26 having an output shaft 74 which is suitably geared as at 76 to the output shaft 78 on which the upper drive roller 70T is disposed. Since the driving means and gearing therefor forms no part of the present invention, any further description thereof will be omitted for the sake of simplicity.

Referring to FIG. 9, there is illustrated the spring tensioning means for the respective blades of the present invention. The tensioning is provided by a coil spring CS having one end disposed in a tubular socket 34 mounted on the blade channel sections of the guide means 30. The other end of coil spring CS presses against a collar C on a screw S which is concentrically disposed within the coil springs CS and has an end passing through an aperture in a bracket 48. A cutout 46 in the blades is provided for adjustment by a wrench. A pair of nuts are threaded on screws at opposite sides of bracket 48 and are adjustable to move collar C to various positions. It can be readily seen that the tension of the coil springs CS and thus the tension on the respective blades 40 may be readily adjusted by turning the screw S in nuts 49 until a desired tension is obtained as a function of the position of collar C.

It should be understood that the stripper of the present invention may be modified as would occur to one of ordinary skill in the art without departing from the spirit and scope of the present invention.

What is claimed is:

1. A blade assembly for stripping leaves from a substantially circular plant stalk comprising:
   blade guide means including four channel sections defining a cruciform shape and extending outwardly from a central opening adapted for passing said stalk therethrough as said leaves are stripped;
   a stripper blade disposed in each of said channel sections for reciprocating movement with respect to said central opening, each of said blades having a substantially circular aperture therein overlying said central opening and superimposed with respect to the respective circular apertures of the other blades and an outboard end having an actuating cam surface thereon, said circular apertures of said blades collectively defining a substantially circular stripper opening in all positions of said blades, the size of which is adjustable in response to a mechanical force applied to said actuating cam surfaces;
   blade pusher means for simultaneously engaging said actuating cam surfaces for applying said mechanical force thereto to move said blades outwardly in said channel sections and thereby enlarge said stripper opening defined by said blade apertures; and
   spring tension means for yieldably biasing said blades toward said central opening to positions defining a minimum size stripper opening.

2. The blade assembly according to claim 1, wherein said blade pusher means includes four radial arms defining a cruciform shape, the outboard ends of each of said arms having pusher tabs for engaging the respective actuator cam surfaces of said stripper blades and further including bearing means for rotatably supporting said blade pusher means with respect to said central opening, whereby rotation of said pusher means applies said mechanical force to enlarge said stripper opening.

3. The blade assembly according to claim 1 or 2, wherein said spring tension means includes means for adjusting the spring tension and said minimum size stripper opening.

4. The blade assembly according to claim 1 or 2, wherein said spring tension means comprises a socket secured to each of said channel sections, a coil spring for each of said sockets with one end disposed in said socket and an opposite end secured to an associated stripper blade, and an adjustment screw concentrically disposed within said spring and threaded within said socket, whereby rotation of said screw adjusts the tension of the associated coil spring.

5. A blade assembly for stripping leaves from a substantially circular plant stalk comprising:
   blade guide means including a plurality of guide sections disposed around a central opening adapted for passing said stalk therethrough as said leaves are stripped;
   a stripper blade disposed in each of said guide sections for reciprocating movement with respect to said central opening, each of said blades having a substantially circular aperture therein overlying said central opening and superimposed with respect to the respective circular aperture of the other blades, and an outboard end having an actuating cam surface thereon, said circular apertures of said blades collectively defining a substantially circular stripper opening, the size of which is adjustable in response to a mechanical force applied to said actuating cam surfaces;

blade pusher means for simultaneously engaging said actuating cam surface for applying said mechanical force thereto to move said blades outwardly in said guide sections and thereby enlarge said stripper opening defined by said blade apertures.

6. Blade assembly according to claim 5, further including spring tension means for biasing said blades toward said central opening to positions defining a minimum size stripper opening.

7. The blade assembly according to claim 5, wherein said blade pusher means includes radial arms, the outboard ends of each of said arms having pusher tabs for engaging the respective actuator cam surfaces of said stripper blades and further including bearing means for rotatably supporting said blade pusher means with respect to said central opening, whereby rotation of said pusher means applies said mechanical force to enlarge said stripper opening.

8. The blade assembly according to claim 6 or 7, wherein said spring tension means includes means for adjusting the spring tension and said minimum size stripper opening.

9. The blade assembly according to claim 6, wherein said spring tension means comprises a socket secured to each of said guide sections, a coil spring for each of said sockets with one end disposed in said socket and an opposite end secured to an associated stripper blade, and an adjustment screw concentrically disposed within said spring and threaded within said socket, whereby rotation of said screw adjusts the tension of the associated coil spring.

10. An apparatus for stripping leaves from a substantially circular plant stalk comprising:

stripper blade means configured to define a stripper opening which is adjustable in size from a minimum to a maximum and through which said stalk is passed as said leaves are stripped;

means for adjusting the stripper opening to said maximum size prior to the insertion of said stalk therein; and spring tension means for yieldably biasing said blade means to define a stripper opening of said minimum size after said stalk is inserted therein.

11. The apparatus according to claim 10, wherein said means for adjusting includes a foot pedal for initiating the adjustment of said stripper opening via a mechanical linkage connected to said stripper blade means.

12. The apparatus according to claim 11, further including a solenoid electrically connected to said foot pedal and mechanically connected to said mechanical linkage.

* * * * *